United States Patent
Yeon et al.

(10) Patent No.: US 8,670,951 B2
(45) Date of Patent: Mar. 11, 2014

(54) ELECTRONIC SCALE HAVING FUNCTION OF COMPENSATING FOR AIR PRESSURE CHANGES IN GLOVE BOX

(75) Inventors: Jei-Won Yeon, Daejeon (KR); Kyuseok Song, Daejeon (KR); Sang Eun Bae, Chungcheongnam-do (KR); Jong-Yun Kim, Seo-gu (KR); Hong-Joo Ahn, Daejeon (KR); Yong Joon Park, Daejeon (KR)

(73) Assignees: Korea Atomic Energy Research Institute (KR); Korea Hydro and Nuclear Power Co., Ltd (KR)

( * ) Notice: Subject to any disclaimer, the term of this patent is extended or adjusted under 35 U.S.C. 154(b) by 397 days.

(21) Appl. No.: 13/228,018

(22) Filed: Sep. 8, 2011

(65) Prior Publication Data

US 2012/0123721 A1     May 17, 2012

(30) Foreign Application Priority Data

Nov. 11, 2010 (KR) .................. 10-2010-0112090

(51) Int. Cl.
*G01G 23/01* (2006.01)

(52) U.S. Cl.
CPC ...................... *G01G 23/01* (2013.01)
USPC .......................... 702/101; 177/154

(58) Field of Classification Search
CPC ...................................... G01G 23/01
USPC ........................................................ 702/101
See application file for complete search history.

(56) References Cited

U.S. PATENT DOCUMENTS 5,610,373 A * 3/1997 Graves et al. .................... 177/50
5,832,417 A * 11/1998 Petrucelli et al. ............. 702/101

FOREIGN PATENT DOCUMENTS

| JP | A 2006071391 | 3/2006 |
| KR | 100388940 | 6/2006 |
| KR | 1020080049946 | 6/2008 |
| KR | 20-2010-0003743 | 4/2010 |
| WO | WO 2009/112821 | 9/2009 |

\* cited by examiner

*Primary Examiner* — Bryan Bui
(74) *Attorney, Agent, or Firm* — Sheridan Ross P.C.

(57) ABSTRACT

The present invention relates to an electronic scale having an air pressure change compensation function, which can precisely measure the weight of an object to be weighed even in an environment in which air pressure changes moment by moment in an airtight space such as in a glove box. According to the present invention, there is provided an electronic scale having an internal air pressure measurement sensor, by which the function of correcting the weight of an object to be weighed is provided even in an environment in which air pressure changes such as in the glove box is provided, thus enabling the weight of a sample to be precisely measured even in an environment in which air pressure changes moment by moment.

13 Claims, 2 Drawing Sheets

__US 8,670,951 B2__

ELECTRONIC SCALE HAVING FUNCTION OF COMPENSATING FOR AIR PRESSURE CHANGES IN GLOVE BOX

BACKGROUND OF THE INVENTION

1. Field of the Invention

The present invention relates, in general, to electronic scales and, more particularly, to an electronic scale having the function of compensating for changes in air pressure so as to precisely measure weights even in an environment in which internal air pressure easily changes as in the case of a glove box.

Further, the present invention relates to an electronic scale having an air pressure change compensation function, which can also be applied to an electronic weighing apparatus equipped with a load sensor having a load cell, as well as to an electronic scale which generates electromagnetic force opposing a load on a plate and detects the load on the plate based on the magnitude of the generated electromagnetic force or the like.

2. Description of the Related Art

Generally, in electronic scales, a measuring plate fits on a load detection unit, and a load acting on the measuring plate is detected by such a load detection unit.

Further, in order to perform averaging and digital filtering, detected data is input moment by moment to a data processing device such as a microcomputer. Such input data is converted into a weight, and this weight is displayed as a measured weight on a display unit.

An example of the above conventional electronic scale includes, for example, the "electronic scale" disclosed in Korean Utility Model Publication No. 20-0419363 (date of registration: Jun. 13, 2006).

That is, the electronic scale of the above Korean Utility Model Publication No. 20-0419363 employs a scheme wherein a reduction in the weight of a material being measured is detected, and is capable of transmitting a signal when a preset value is reached. In detail, when a load is detected by a detection sensor as being equal to or less than a preset load, the electronic scale implements a system for generating a signal, transferring a signal to an Integrated Circuit (IC) unit, calculating the signal at that time using the IC unit, and generating a signal such as a warning lamp or on/off light signal. Therefore, in a facility or the like equipped with a system for periodically replenishing and continuously supplying material such as powder or liquid, there can be provided an electronic scale capable of efficiently performing management and handling related to the operation of the facility in such a way that when the material is continuously consumed and the amount of material decreases gradually, the electronic scale is capable of signaling a worker at the suitable time, that is, before all of the material is exhausted, and the material can be effectively replenished at the proper time.

Further, another example of the above-described conventional electronic scale includes, for example, the "electronic scale and method of controlling the same" disclosed in Korean Patent Laid-open Publication No. 10-2009-0123724 (date of publication: Dec. 2, 2009).

That is, the electronic scale disclosed in Korean Patent Laid-open Publication No. 10-2009-0123724 relates to an electronic scale and method of controlling the electronic scale, in which a weight corresponding to a percentage, weight (%) or a ratio input by a user is displayed. This electronic scale is characterized in that it includes an input unit for inputting ratio information from the user, a measurement unit for measuring the weight of a material, a microprocessor for converting the weight measured by the measurement unit according to the ratio information input to the input unit, and a display unit for displaying the converted weight under the control of the microprocessor.

In detail, the above Korean Patent Laid-open Publication No. 10-2009-0123724 is intended to provide an electronic scale which displays a weight (%) or a percentage that is the relative amount of each of a plurality of materials or displays a weight corresponding to the ratio input by the user, in order to solve the following conventional problem. That is, the problem is that even if, in the case of recipes for cooking, confectioneries, and baking, the amounts of materials are displayed based on the specific number of persons (for example, four persons), the conventional electronic scales merely measure the absolute weight of each material, so that when a user must cook with an amount of material that is larger or smaller than a reference amount, the amounts of all materials must be separately calculated according to the ratio of the materials.

However, the electronic scales disclosed in Korean Utility Model Publication No. 20-0419363 and Korean Patent Laid-open Publication No. 10-2009-0123724 do not describe methods of compensating for errors that may occur for a variety of internal or external reasons.

In this regard, a further example of the conventional technology includes, for example, the "electronic scale capable of compensating for errors attributable to eccentricity and inclination" disclosed in Korean Patent No. 10-0388940 (date of registration: Jun. 12, 2003).

That is, the "electronic scale capable of compensating for errors attributable to eccentricity and inclination" disclosed in the above Korean Patent No. 10-0388940 relates to the electronic scale for, when a plate on which an object to be weighed is placed is inclined, correcting measurement errors attributable to this inclination while compensating for the eccentricity of the object to be weighed, thus enabling a load to be precisely measured.

For this, the above patent No. 10-0388940 discloses an electronic scale characterized in that it includes a base plate, an upper plate, a plurality of vertical component force load cells, a vertical component force bridge circuit, a load output unit, a plurality of horizontal component force load cells, and at least one horizontal component force bridge circuit. The upper plate is arranged on the top of the base plate and allows an object to be weighed to be placed thereon. Each of the vertical component force load cells includes at least one vertical component force sensor which is disposed between the base plate and the upper plate and is subjected in the direction of gravity to the load of the upper plate with the weighing object placed thereon, and which has a resistance that varies with a variation in its external shape caused by the load. The vertical component force bridge circuit is configured to include the individual vertical component force sensors. The load output unit calculates the load of the object to be weighed based on a vertical component force voltage output from a predetermined location in the bridge circuit. Each of the horizontal component force load cells includes at least one horizontal component force sensor which is arranged in the lateral direction of the upper plate and is subjected in the direction of the surface of the upper plate to a horizontal component force by the upper plate inclined with respect to a horizontal direction, and which has a resistance that varies with a variation in its external shape caused by the horizontal component force. The at least one horizontal component force bridge circuit is configured to include at least a part of the horizontal component force sensors. In this case, the load output unit calculates the load of the object to be weighed based on a horizontal component force voltage output from a predetermined location in the horizontal component force bridge circuit and the vertical component force voltage output from the predetermined location in the vertical component force bridge circuit.

However, since the above-described conventional electronic scales calculate the weight from changes in the pressure that an object to be weighed applies to a load detection sensor, changes in surrounding air pressure may influence the weight measured by the electronic scales when there are changes in the surrounding air pressure, but those conventional electronic scales never take such a situation into account.

In this case, in a normal air pressure environment, since a change in air pressure occurring over the short period during which a weight is measured is significantly small, there is no need to especially take such a change into account.

However, for example, in an airtight space having a small volume, such as a glove box, as a worker uses the glove, the internal pressure changes moment by moment.

Therefore, since in such an environment the differences in air pressure change the weight of an object to be weighed, it is impossible to precisely measure the weight when the conventional typical electronic scale is used, thus increasing measurement errors.

That is, in an airtight space such as the glove box, internal air pressure is easily changed, so that such air pressure changes result in immediate measurement errors for the conventional electronic scale.

Therefore, in order to suppress such errors, changes in the air pressure inside the airtight space when the weight is being measured must be minimized, but it is difficult to achieve such minimization in the narrow space in which the glove is mounted.

Furthermore, because the conventional typical electronic scale does not have the function of detecting a change in air pressure and compensating for the weight difference corresponding to the air pressure change, a problem arises in that a large error occurs in the measurement of weights using the electronic scale, for example, in an environment in which internal air pressure changes such as in a glove box.

Furthermore, the conventional electronic scale is also problematic in that when a weight is measured, for example, in an environment in which air pressure changes moment by moment, as described above, the weight displayed on the display unit also changes moment by moment, thus making it very difficult for a user to observe the measured weight with the naked eye.

Therefore, in order to solve the problems occurring in the measurement of weights using the conventional electronic scales, an electronic scale must be provided with the function of sensing a change in an air pressure in an environment in which internal air pressure changes such as in a glove box, and compensating for a weight difference corresponding to the change. Accordingly, it is preferable to provide an electronic scale that enables a weight displayed on the display unit to persist for a predetermined period of time so that the user can easily observe the displayed weight, even if the measured weight changes moment by moment, while always precisely measuring weights even in an environment in which air pressure changes moment by moment. However, such an electronic scale that satisfies all of those requirements has not yet been provided.

SUMMARY OF THE INVENTION

Accordingly, the present invention has been made keeping in mind the above problems occurring in the prior art, and an object of the present invention is to provide an electronic scale, which compensates for changes in air pressure using an air pressure measurement sensor, thus precisely measuring and displaying the weight of an object to be weighed by conveniently correcting the weight of the object to be weighed even in an environment in which the internal air pressure changes moment by moment such as in a glove box.

Another object of the present invention is to provide an electronic scale, which solves the conventional problem of making it difficult for a user to observe a measured weight because the measured weight changes moment by moment in an environment in which the surrounding pressure of measurement changes moment by moment, thus pursuing the user's convenience by introducing a device for delaying or holding the displaying of a measured weight.

In accordance with an aspect of the present invention, there is provided an electronic scale having an air pressure change compensation function, including a measuring plate on which an object to be weighed is placed, a load detection unit for detecting a weight of the object to be weighed, an air pressure measurement unit for measuring air pressure when the load detection unit detects the weight of the object to be weighed, a signal conversion unit for converting each detected signal into a digital signal using Analog/Digital (A/D) conversion, an air pressure compensation calculation unit for calculating a difference between air pressure obtained upon zero point adjustment and air pressure obtained upon measuring the weight of the object to be weighed, based on the signal output from the signal conversion unit, a measured weight calculation unit for correcting the measured weight by taking into consideration the air pressure difference calculated by the air pressure compensation calculation unit, and a display control unit for displaying a resulting measured weight finally calculated by the measured weight calculation unit and controlling an overall operation of the electronic scale.

Preferably, the electronic scale may further include a display hold button for holding displaying of the measured weight or a display delay button for delaying display time of the measured weight.

Preferably, the display hold button or the display delay button may be either an on/off switch button or a button having a toggle function.

Preferably, the delay time of the display delay button may be equal to or greater than 0.5 seconds and is equal to or less than 10 seconds.

Preferably, the load detection unit may be an electromagnetic force balancing instrument for generating an electromagnetic force corresponding to a load on the measuring plate and detecting the load on the measuring plate from a magnitude of the generated electromagnetic force.

Preferably, the load detection unit may be a load cell to which a force corresponding to a load on the measuring plate is applied.

Preferably, the load detection unit may be a wavelength generation instrument for generating a wavelength corresponding to a load on the measuring plate and detecting the load on the measuring plate from frequency variations at the wavelength.

Preferably, the load detection unit may generate an electrical signal corresponding to a load on the measuring plate and detect the load on the measuring plate from a magnitude of the electrical signal.

Preferably, the electrical signal may include one or more of an electrical resistance, a voltage signal, and a current signal.

Preferably, the air pressure measurement unit may include one or more of an electronic pressure measurement sensor, an electromagnetic force-type pressure sensor, a semiconductor pressure sensor, and a measurement sensor using mercury.

Preferably, the air pressure measurement unit may be implemented as a detector having a structure identical to that of the load detection unit.

Preferably, the air pressure compensation calculation unit may compensate for a change in pressure by converting a change in pressure relative to air pressure collected upon the zero point adjustment into a change in weight.

Further, in accordance with another aspect of the present invention, there is provided a measurement method of correcting a measurement error caused by a change in air pressure, including adjusting a zero point of an electronic scale by activating a tare button (a zero point adjustment button) of the electronic scale, collecting data about a weight of a measuring plate of the electronic scale, measuring and collecting data about air pressure upon zero point adjustment together with the data about the weight of the measuring plate, placing an object to be weighed on the measuring plate and then collecting data about air pressure upon the measurement together with data about a weight of the object to be weighed, calculating data about an actual weight of the object to be weighed by subtracting the weight data of the measuring plate from the measured weight data of the object to be weighed, calculating a change in air pressure from the air pressure data collected upon the zero point adjustment and the air pressure data collected upon measuring the object to be weighed, and calculating a weight corresponding to the air pressure change based on the change obtained at the calculating of the air pressure change, and displaying the weight.

Preferably, the displaying may include determining whether a request for delay or hold of displaying has been received, if it is determined that the request for delay or hold of displaying has been received, displaying the weight by delaying or holding a display time by or for a predetermined time, and if it is determined that a request for delay or hold of displaying has not been received or if a requested delay time has elapsed, returning to the collecting the data about air pressure upon the measurement together with the data about the weight of the object to be weighed, and then repeating subsequent processing.

Preferably, the delay time may be equal to or greater than 0.5 seconds and is equal to or less than 10 seconds.

In accordance with a further aspect of the present invention, there is provided an electronic scale having an air pressure change compensation function, including a measuring plate on which an object to be weighed is placed, a load detection unit for detecting a weight of the object to be weighed, an air pressure measurement unit for measuring air pressure when the load detection unit detects the weight of the object to be weighed, a signal conversion unit for converting each detected signal into a digital signal using Analog/Digital (A/D) conversion, an air pressure compensation calculation unit for calculating a difference between air pressure obtained upon zero point adjustment and air pressure obtained upon measuring the weight of the object to be weighed, based on the signal output from the signal conversion unit, a measured weight calculation unit for correcting a measured weight by taking into consideration the air pressure difference calculated by the air pressure compensation calculation unit, and a display control unit for displaying a resulting measured weight finally calculated by the measured weight calculation unit and controlling an overall operation of the electronic scale, the display control unit having a display hold button for holding displaying the measured weight, or a display delay button for delaying display time of the measured weight.

Preferably, the display hold button or the display delay button may be either an on/off switch button or a button having a toggle function.

Preferably, the delay time of the display delay button may be equal to or greater than 0.5 seconds and is equal to or less than 10 seconds.

Preferably, the load detection unit may be an electromagnetic force balancing instrument for generating an electromagnetic force corresponding to a load on the measuring plate and detecting the load on the measuring plate from a magnitude of the generated electromagnetic force.

Preferably, the load detection unit may be a load cell to which a force corresponding to a load on the measuring plate is applied.

Preferably, the load detection unit may be a wavelength generation instrument for generating a wavelength corresponding to a load on the measuring plate and detecting the load on the measuring plate from frequency variations at the wavelength.

Preferably, the load detection unit may generate an electrical signal corresponding to a load on the measuring plate and detects the load on the measuring plate from a magnitude of the electrical signal.

Preferably, the electrical signal may include one or more of an electrical resistance, a voltage signal, and a current signal.

Preferably, the air pressure measurement unit may include one or more of an electronic pressure measurement sensor, an electromagnetic force-type pressure sensor, a semiconductor pressure sensor, and a measurement sensor using mercury.

Preferably, the air pressure measurement unit may be implemented as a detector having a structure identical to that of the load detection unit.

Preferably, the air pressure compensation calculation unit may compensate for a change in pressure by converting a change in pressure relative to air pressure collected upon the zero point adjustment into a change in weight.

In accordance with yet another aspect of the present invention, there is provided a measurement method for correcting a measurement error caused by a change in air pressure, including adjusting a zero point of an electronic scale by activating a tare button of the electronic scale, collecting data about a weight of a measuring plate of the electronic scale, measuring and collecting data about air pressure upon zero point adjustment together with the data about the weight of the measuring plate, placing an object to be weighed on the measuring plate and then collecting data about air pressure upon the measurement together with data about a weight of the object to be weighed, calculating data about an actual weight of the object to be weighed by subtracting the weight data of the measuring plate from the measured weight data of the object to be weighed, calculating a change in air pressure from the air pressure data collected upon zero point adjustment and the air pressure data collected upon measuring the object to be weighed, calculating a weight corresponding to the air pressure change based on the change obtained at the calculating of the air pressure change, and displaying the weight, determining whether a request for delay or hold of displaying has been received at the displaying, if it is determined that the request for delay or hold of displaying has been received, displaying the weight by delaying or holding display time for a relevant time, and if it is determined that a request for delay or hold of displaying has not been received or if a requested delay time has elapsed, returning to the collecting the data about air pressure upon the measurement together with the data about the weight of the object to be weighed, and then repeating subsequent processing.

Preferably, the delay time may be equal to or greater than 0.5 seconds and is equal to or less than 10 seconds.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, detailed contents of an electronic scale having an air pressure change compensation function according to the present invention will be described with reference to the attached drawings.

It should be noted that the contents which will be described below are only those of a single embodiment that implements the present invention, and the present invention is not limited to the contents of the embodiment described below.

That is, as will be described later, the present invention is intended to provide a weighing apparatus which includes a load detection unit, an air pressure measurement unit, a signal conversion unit, an air pressure compensation calculation unit, a measured weight calculation unit, and a display control unit equipped with a measured weight display hold or delay button, and then has the function of precisely compensating for changes in internal air pressure.

Next, the detailed construction of an electronic scale having an air pressure change compensation function according to the present invention will be described below with reference to FIG. 1.

Figure 1:
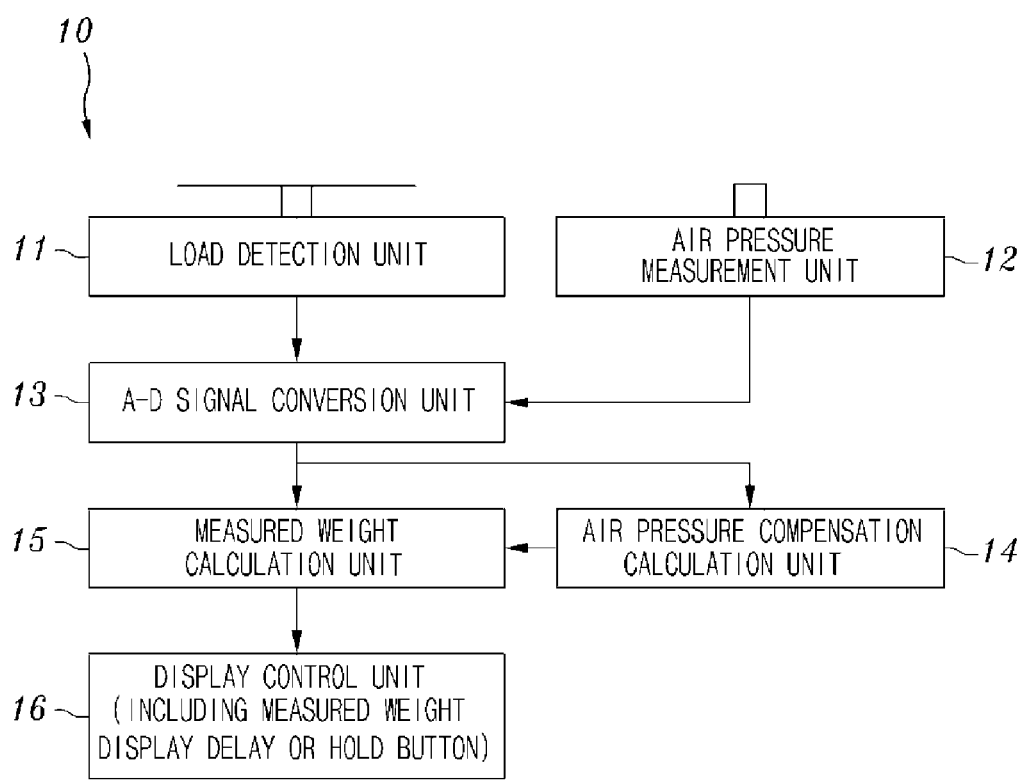
FIG. 1 is a block diagram schematically showing the overall construction of an electronic scale as a detailed embodiment of an electronic scale having an air pressure change compensation function according to the present invention.

As shown in FIG. 1, an electronic scale 10 to which a method of correcting weights depending on changes in pressure is introduced according to the present invention is configured to include a load detection unit 11, an air pressure measurement unit 12, a signal conversion unit 13, an air pressure compensation calculation unit 14, a measured weight calculation unit 15, and a display control unit 16. The load detection unit 11 detects the weight of an object to be weighed. The air pressure measurement unit 12 measures air pressure when the load detection unit 11 detects the weight of the object to be weighed. The signal conversion unit 13 converts each detected signal into a digital signal using Analog/Digital (A/D) conversion. The air pressure compensation calculation unit 14 calculates the difference between the air pressure obtained upon zero point adjustment and the air pressure obtained upon measuring the weight of the object to be weighed on the basis of the signal output from the signal conversion unit 13. The measured weight calculation unit 15 corrects the measured weight by taking into consideration the pressure value difference calculated by the air pressure compensation calculation unit 14. The display control unit 16 displays the resulting measured weight finally calculated by the measured weight calculation unit 15, controls the overall operation of the electronic scale 10, and includes a measured weight display hold or delay button installed thereon.

In detail, an electronic scale generally activates a zero point button before measuring the weight of the object to be weighed, and then eliminates the weight of an object required to carry out the measurement such as a measuring plate. In addition, the present invention measures and collects the air pressure of the space in which the electronic scale is located, in order to compensate for changes in air pressure when the weight of an actual object to be weighed is measured, as well as when zero point adjustment is performed.

Therefore, air pressure is continuously measured to the time point at which the weight of the object to be weighed will be displayed, a difference between air pressure measured upon the zero point adjustment and the changed air pressure at the time point of displaying is calculated by the air pressure compensation calculation unit 14, and is reflected in the displaying of the measured weights.

In this case, the load detection unit 11 may be implemented using an electromagnetic force balancing instrument for generating an electromagnetic force corresponding to a load on a measuring plate and detecting the load on the measuring plate from the magnitude of the generated electromagnetic force.

Alternatively, the load detection unit 11 may be implemented using a load cell to which a force corresponding to the load on the measuring plate is applied.

Alternatively, the load detection unit 11 may also be implemented using a method of utilizing variations in the wavelength of a crystal oscillator by exploiting a wavelength generation instrument for generating a wavelength corresponding to the load on the measuring plate and detecting the load on the relevant measuring plate from frequency variations of the wavelength.

In addition, the load detection unit 11 may be implemented using a method of utilizing electrical signals from a piezoelectric device in such a way as to generate an electrical signal corresponding to a load on the measuring plate and to detect the load on the measuring plate from the magnitude of the electrical signal. In this case, the electrical signal includes one or more of an electrical resistance, a voltage signal, and a current signal.

Furthermore, the air pressure measurement unit 12 may be configured to include one or more of an electronic pressure measurement sensor, an electromagnetic force-type pressure sensor, a semiconductor pressure sensor, and a measurement sensor using mercury.

Meanwhile, in order to simplify the apparatus while maintaining the precision of measurement, it is preferable to use the same device for the load detection unit 11 and the air pressure measurement unit 12.

Further, the air pressure compensation calculation unit 14 may be implemented using, for example, a device for converting a change in pressure relative to air pressure measured upon the zero point adjustment into a change in weight, and for compensating for the change in air pressure.

In addition, the display control unit 16 controls the overall operation of the electronic scale 10 and is configured to be able to control a display time for which the actually measured weights are displayed on the display unit by providing a weight display delay or hold button, while displaying the resulting measured weight finally calculated by the measured weight calculation unit 15. Accordingly, the display control unit 16 displays weights, which have been continuously measured, at regular intervals, thus allowing an observer to easily read the weights.

In this case, in the case of the intervals at which the measured weights are displayed, when weights are generally displayed at intervals of a predetermined time that is equal to or greater than 0.5 seconds and is equal to or less than 10 seconds in consideration of the visual reaction speed of human beings, the observer can easily read the measured weights while the precision of measurement is maintained.

Further, the weight display delay or hold button may be configured in the form of an on/off switch button or a button having a toggle function.

Next, the detailed operation of the electronic scale 10 having an air pressure change compensation function according to the present invention, having the above construction, will be described with reference to FIG. 2.

Figure 2:
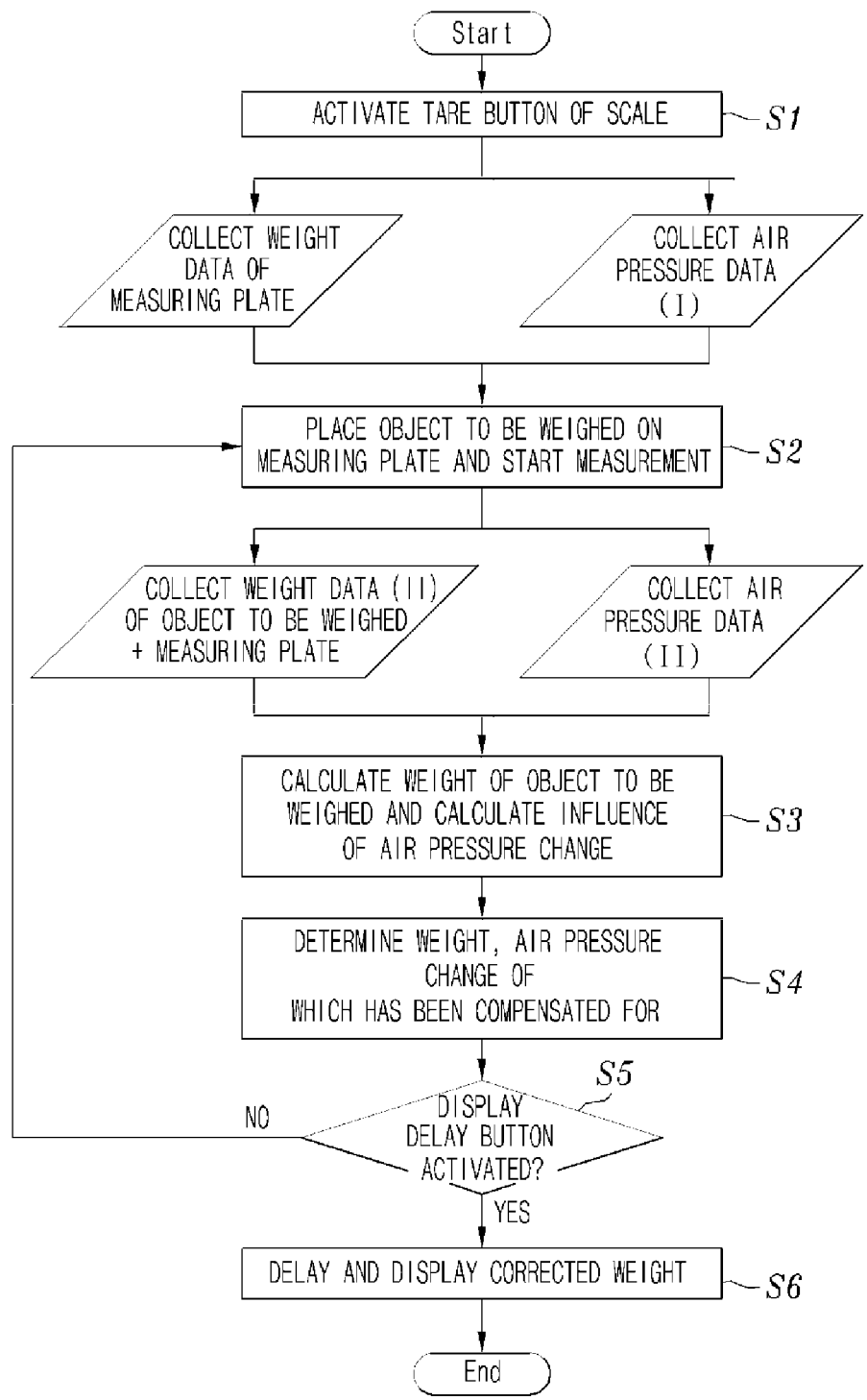
FIG. 2 is a flowchart showing a procedure for processing the weighing operation of the electronic scale of FIG. 1 having the air pressure change compensation function according to the present invention.

As shown in FIG. 2, in the detailed description of the electronic scale 10 having the air pressure change compensation function according to the present invention, the zero point of the electronic scale is adjusted by activating the tare button of the scale at step S1.

In this case, data about the weight of a measuring plate is collected and is reflected in subsequent measurements while air pressure data upon zero point adjustment is measured and collected together with the weight of the measuring plate.

Next, an object to be weighed is placed on the measuring plate, and data about air pressure upon the measurement together with data about the weight of the object to be weighed are collected at step S2.

Thereafter, data about the weight of the actual object to be weighed is calculated by subtracting the weight data of the measuring plate collected at step S1 from the weight data of the object to be weighed, collected at step S2, and a change between air pressure data collected upon the zero point adjustment and air pressure data measured upon actual measurement is calculated at step S3.

Thereafter, the weight corresponding to the change in air pressure is calculated by taking into consideration the change in air pressure calculated at step S3, and is then displayed on the display unit at step S4.

If it is determined that a request for delay or hold of displaying has been received at step S5, the weight is displayed by delaying or holding the display time for a relevant time at step S6.

Further, if it is determined that a request for delay or hold of displaying has not been received or if a requested delay time has elapsed at step S5, the process returns to step S2, and repeats subsequent processing starting from step S2.

Therefore, as described above, the present invention can provide an electronic scale which is provided with the function of delaying or holding the displaying of measured weights while always precisely measuring and displaying the weight of the object to be weighed even in an environment in which the internal air pressure changes moment by moment in an airtight space, such as in a glove box. Accordingly, the present invention can solve the problem of the conventional electronic scales in which when measured weights are rapidly changing, displayed weights are also rapidly changing simultaneously with the weights to make it difficult for the user to observe the measured weights, and can pursue the user's convenience.

As described above, although detailed contents of an electronic scale having an air pressure change compensation function according to the present invention have been described with reference to the embodiments of the present invention, the present invention is not limited to those embodiments. Accordingly, those skilled in the art will appreciate that various changes, modifications, combinations and substitutions are possible depending on design requirements and various other factors, without departing from the scope and spirit of the invention as disclosed in the accompanying claims.

Accordingly, the present invention can provide an electronic scale, which includes an air pressure measurement unit and an air pressure compensation calculation unit and has the function of correcting the influence of changes in air pressure even in an environment in which air pressure changes moment by moment, thus always precisely measuring and displaying the weight of an object to be weighed even in an environment in which internal air pressure changes moment by moment such as in a glove box.

Further, the present invention can provide an electronic scale, which has the function of delaying or holding the displaying of measured weights and is then capable of solving the problem of the conventional electronic scales in that when measured weights are rapidly changing, displayed weights are also rapidly changing simultaneously with the weights to make it difficult for a user to observe the measured weights, thus pursuing the user's convenience.

What is claimed is:

1. An electronic scale having an air pressure change compensation function, comprising:
    a measuring plate on which an object to be weighed is placed;
    a load detection unit for detecting a weight of the object to be weighed;
    an air pressure measurement unit for measuring air pressure when the load detection unit detects the weight of the object to be weighed;
    a signal conversion unit for converting each detected signal into a digital signal using Analog/Digital (A/D) conversion;
    an air pressure compensation calculation unit for calculating a difference between air pressure obtained upon zero point adjustment and air pressure obtained upon measuring the weight of the object to be weighed, based on the signal output from the signal conversion unit;
    a measured weight calculation unit for correcting a measured weight by taking into consideration the air pressure difference calculated by the air pressure compensation calculation unit; and
    a display control unit for displaying a resulting measured weight finally calculated by the measured weight calculation unit and controlling an overall operation of the electronic scale, the display control unit having a display hold button for holding displaying the measured weight, or a display delay button for delaying display time of the measured weight.

2. The electronic scale according to claim 1, wherein the display hold button or the display delay button is either an on/off switch button or a button having a toggle function.

3. The electronic scale according to claim 1, wherein the delay time of the display delay button is equal to or greater than 0.5 seconds and is equal to or less than 10 seconds.

4. The electronic scale according to claim 1, wherein the load detection unit is an electromagnetic force balancing instrument for generating an electromagnetic force corresponding to a load on the measuring plate and detecting the load on the measuring plate from a magnitude of the generated electromagnetic force.

5. The electronic scale according to claim 1, wherein the load detection unit is a load cell to which a force corresponding to a load on the measuring plate is applied.

6. The electronic scale according to claim 1, wherein the load detection unit is a wavelength generation instrument for generating a wavelength corresponding to a load on the measuring plate and detecting the load on the measuring plate from frequency variations at the wavelength.

7. The electronic scale according to claim 1, wherein the load detection unit generates an electrical signal corresponding to a load on the measuring plate and detects the load on the measuring plate from a magnitude of the electrical signal.

8. The electronic scale according to claim 7, wherein the electrical signal comprises one or more of an electrical resistance, a voltage signal, and a current signal.

9. The electronic scale according to claim 1, wherein the air pressure measurement unit comprises one or more of an electronic pressure measurement sensor, an electromagnetic force-type pressure sensor, a semiconductor pressure sensor, and a measurement sensor using mercury.

10. The electronic scale according to claim 1, wherein the air pressure measurement unit is implemented as a detector having a structure identical to that of the load detection unit.

11. The electronic scale according to claim 1, wherein the air pressure compensation calculation unit compensates for a change in pressure by converting a change in pressure relative to air pressure collected upon the zero point adjustment into a change in weight.

12. A measurement method for correcting a measurement error caused by a change in air pressure, comprising:
- adjusting a zero point of an electronic scale by activating a tare button of the electronic scale;
- collecting data about a weight of a measuring plate of the electronic scale;
- measuring and collecting data about air pressure upon zero point adjustment together with the data about the weight of the measuring plate;
- placing an object to be weighed on the measuring plate and then collecting data about air pressure upon the measurement together with data about a weight of the object to be weighed;
- calculating data about an actual weight of the object to be weighed by subtracting the weight data of the measuring plate from the measured weight data of the object to be weighed;
- calculating a change in air pressure from the air pressure data collected upon zero point adjustment and the air pressure data collected upon measuring the object to be weighed;
- calculating a weight corresponding to the air pressure change based on the change obtained at the calculating of the air pressure change, and displaying the weight;
- determining whether a request for delay or hold of displaying has been received at the displaying;
- if it is determined that the request for delay or hold of displaying has been received, displaying the weight by delaying or holding display time for a relevant time; and
- if it is determined that a request for delay or hold of displaying has not been received or if a requested delay time has elapsed, returning to the collecting the data about air pressure upon the measurement together with the data about the weight of the object to be weighed, and then repeating subsequent processing.

13. The measurement method according to claim 12, wherein the delay time is equal to or greater than 0.5 seconds and is equal to or less than 10 seconds.

* * * * *